US006015531A

United States Patent [19]

Colin et al.

[11] Patent Number: 6,015,531

[45] Date of Patent: Jan. 18, 2000

[54] SINGLE-USE ANALYSIS CARD COMPRISING A LIQUID FLOW DUCT

[75] Inventors: Bruno Colin, Marcy l'Etoile; Cécile Jaravel; Philippe Cleuziat, both of Lyons, all of France

[73] Assignee: Bio Merieux, Marcy l'Etoile, France

[21] Appl. No.: 08/983,492

[22] PCT Filed: Jun. 9, 1997

[86] PCT No.: PCT/FR97/01020

§ 371 Date: Mar. 5, 1998

§ 102(e) Date: Mar. 5, 1998

[87] PCT Pub. No.: WO97/46318

PCT Pub. Date: Dec. 11, 1997

[30] Foreign Application Priority Data

Jun. 7, 1996 [FR] France .................................. 96 07381

[51] Int. Cl.[7] .............................. B01L 3/00; G01N 21/00

[52] U.S. Cl. ........................... 422/58; 422/68.1; 422/102

[58] Field of Search .............................. 422/57, 58, 68.1, 422/102

[56] References Cited

U.S. PATENT DOCUMENTS

| | | | |
|---|---|---|---|
| 3,690,836 | 9/1972 | Buissiere et al. | 422/102 |
| 4,294,931 | 10/1981 | Levein et al. | 422/102 |
| 4,985,204 | 1/1991 | Klose et al. | 422/58 |
| 5,698,395 | 12/1997 | Ritterband et al. | 422/68.1 |

FOREIGN PATENT DOCUMENTS

| | | |
|---|---|---|
| A1 0-339277 | 11/1989 | European Pat. Off. . |

*Primary Examiner*—Jill Warden
*Assistant Examiner*—Kevin P. Cannell
*Attorney, Agent, or Firm*—Oliff & Berridge, PLC

[57] ABSTRACT

The invention features an analysing device (1) comprising a body (2) in which are arranged or provided: an intake aperture (3) for a starting liquid sample, a liquid flow circuit (5) comprising at least one operating cell (6) for a processed liquid sample, obtained from all or part of the original sample, communicating with the said intake aperture (3), the said flow circuit defining, in at least two dimensions of the card, one determined geometric line, such that any alteration in the card orientation in a three-dimensional reference frame, causes the liquid to flow under gravity only, from one part of the said circuit to another,for instance from one side or another of the operating cell, (6) characterised in that, the flow circuit (5) is continuous, and looped on itself between the said aperture (3) and the said operating cell (6).

25 Claims, 5 Drawing Sheets

FIG 11
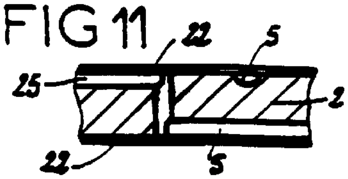
FIG 12
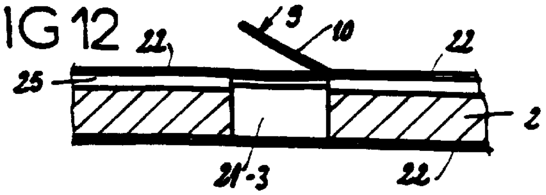
FIG 13
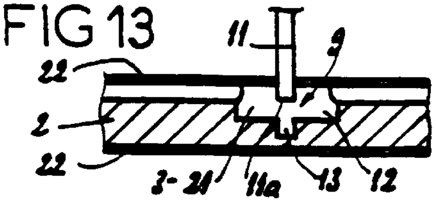
FIG 14
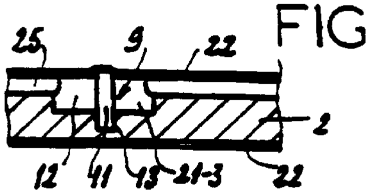
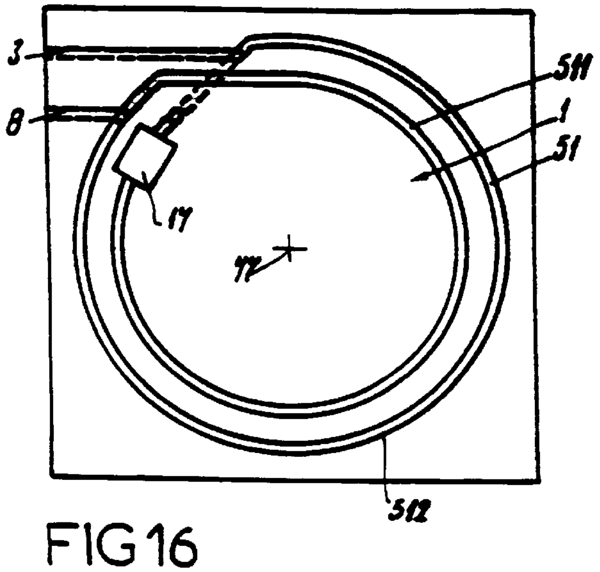
FIG 16
FIG 15
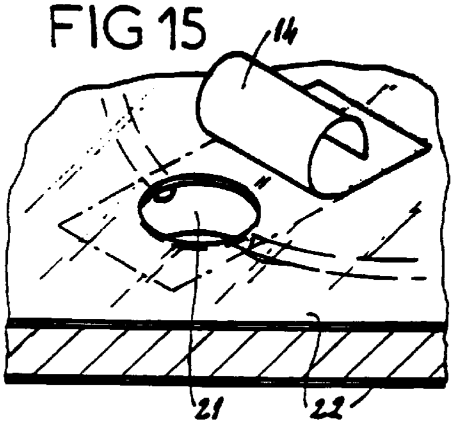
FIG 17
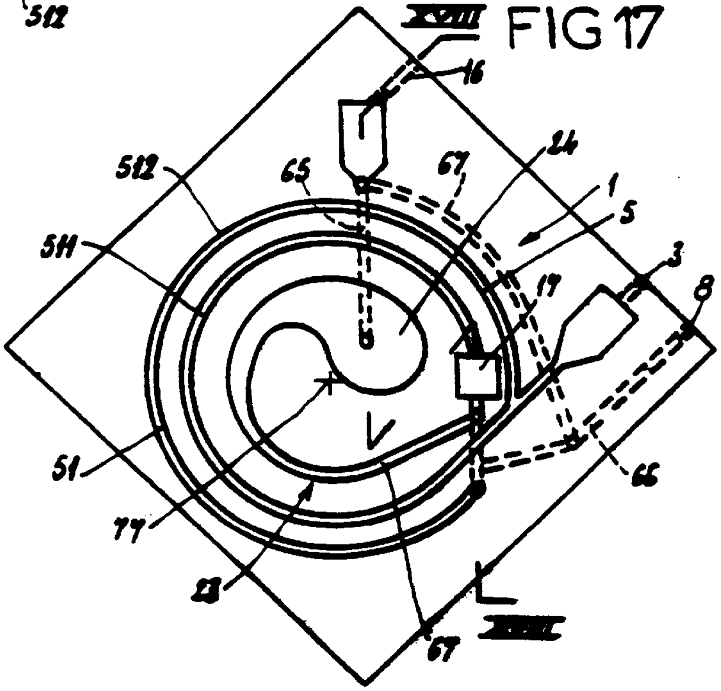

SINGLE-USE ANALYSIS CARD COMPRISING A LIQUID FLOW DUCT

The present invention relates to the analysis of one or more different liquid samples, with the aim of identifying, detecting and/or quantifying one or more analytes in it or them, using any analysis process, simple or complex, involving one or more different reagents, depending on the chemical, biochemical, biological or physical nature of the analyte or analytes being investigated.

The principle techniques defined and described below are not limited to a particular analyte, this generic term denoting both a composition, a compound and any chemical, biochemical or biological species or other entities, the only required condition being that the analyte is distributed as a suspension or solution in the initial liquid sample which is to be analyzed. In particular, the analysis process employed may be carried out in homogeneous, heterogeneous or mixed forms.

By way of non-limiting example, the present invention will nonetheless be illustrated with reference to the biological analysis of one or more ligands which, in order to be detected and/or quantified, require the use of one or more anti-ligands. The term "ligand" is intended to mean any biological species, for example an antigen, an antibody, a nucleic acid, a nucleic acid fragment or an oligonucleotide which can combine with an anti-ligand. An example of an application of the analysis techniques described below therefore relates to immuno-assays, irrespective of their format, for example by direct analysis or by competition. Of course, in the field of biology, the analysis techniques described below are nonetheless applied in the same way to the detection and/or quantification of a nucleic material or nucleotides.

In the field of biological analysis in particular, and as disposable or single-use products, analysis devices or cards are currently manufactured and available which generally comprise a body which is in the form of a plate and in which the following are arranged or formed:

an orifice for introducing an initial liquid sample;

a plurality or multiplicity of operating compartments, containing respectively different reagents and each designed to receive a share or aliquot, treated in each said operating compartment, of the initial liquid sample;

a plurality or multiplicity of liquid transfer ducts, arranged in parallel with respect to one another and each communicating on one side with the introduction orifice and on the other side with an operating compartment.

With an analysis card of this type, the internal volume of which, consisting of the aforementioned elements, has been evacuated or depressurized beforehand, the initial liquid sample to be analyzed is introduced through the introduction orifice, by means of which the liquid in the sample is introduced and distributed, without other intervention, in the various operating compartments. The analysis card is then sealed at its introduction orifice, then subjected to various treatments, in particular incubation, to develop the reactions particular to the analysis process adopted in the various operating compartments, respectively. Lastly, the detection and/or quantification of the reaction products, for example by optical means, in the various operating compartments gives a set of qualitative and/or quantitative data allowing an analysis result to be expressed.

As mentioned above, the various steps or sequences required by the analysis, once the analysis card has been sealed, are generally implemented automatically in suitable analysis equipment, controlled or driven or, in particular, programmed in order to run the required operations automatically.

The above description shows that an analysis card of this type constitutes to some extent a passive component, insofar as it is no longer possible to move a given initial liquid sample, or a treated liquid sample, from one operating compartment to another, in order for any treatment process required for determination of the analyte to be carried out within the same analysis card.

According to document EP-A-0,339,277, an analysis card has been described which constitutes an active component, insofar as its arrangement makes it possible to move any liquid sample from one location in the card to another. To this end, the proposed analysis device comprises a body of flattened shape, in which the following are arranged or formed:

further to an orifice for introducing an initial liquid sample, a liquid flow circuit which can be isolated from the exterior by permanent closing of the introduction orifice, comprising at least one operating compartment for the treated liquid sample, obtained with all or some of the initial sample, and communicating with said introduction orifice; this flow circuit describes, in two dimensions of the card, a geometrical line which, from one end to another, is composed of successive branches, some of which are "dead ends", so that, in a vertical plane or reference frame, any change in the orientation of the card causes the liquid to flow, solely under gravity, from one section or branch to another section or branch of the same circuit, for example from one side of the operating compartment or the other.

A card of this type, which has relatively large dimensions, permits any liquid to be made to flow, simply under gravity, in the flow circuit which is isolated from the exterior, because of the relatively large or open cross section of said circuit.

This is not the case with a card which has relatively small dimensions and/or employs a circuit of relatively small cross section, such as a capillary duct, in the case of which surface tension forces oppose the flow of any liquid when said circuit is isolated from the exterior.

The present invention therefore relates to an analysis device, in particular a single-use analysis card, which, once said device has been sealed or closed off from the exterior, permits regular flow of any liquid sample, including in the case of a capillary-type flow circuit.

As before, gravity is adopted as the way of displacing or moving any liquid within the card. Further, according to the invention, the flow circuit is both continuous and looped on itself, between the introduction orifice and the operating compartment.

In particular, when the device comprises at least one liquid transfer duct, arranged or formed in the body, communicating on one side with the introduction orifice and, on the other side, with the operating compartment, the continuous flow circuit is looped onto the transfer duct.

The term "continuous" is intended to mean the characteristic according to which any portion of the flow circuit in question has, on either side respectively, two inlet and/or outlet orifices. This attribute excludes, in particular, the possibility of a "dead end", which implies that the portion of the circuit in question has only a single inlet and/or outlet orifice. This attribute does not rule out the characteristic according to which one or more circuits or ducts, themselves "blind alleys" may communicate with or be connected to the continuous circuit in question.

The term "looped onto itself" is intended to mean the characteristic according to which the continuous flow circuit forms a complete loop in the space, that is to say in the volume of the body of the analysis card, such that any volume of liquid present in the duct is substantially under equal pressure on each side of the liquid column thus formed. A characteristic of this type allows this liquid column to be moved without any constraint or resistance, since the volume of gas displaced from one side will be recycled or returned to the other side of this column. Of course, as mentioned above, this continuous flow duct which is looped on itself furthermore communicates with one or more orifices for introducing the liquid samples, and one or more vent orifices, as described below.

Consequently, according to the invention, the liquids flow in the analysis card simply under the effect of gravity, without any particular resistance resulting from the pressure reduction created by the flow or capillary action, this being achieved merely by changing the orientation of the card. Of course, in order to obtain movement of this type, a sufficient level of liquid must be available for the liquid sample which is treated. The person skilled in the art will be capable of using the routine tests to determine this minimum level, in particular according to the liquid which is treated and its characteristics, as well as those of the continuous flow duct.

Preferably, when the body of the analysis card has the form of a plate, the geometrical line described by the continuous flow circuit comprises at least one planar segment which lies in a plane, for example parallel to or coinciding with one of the faces of the plate. Furthermore, this planar segment itself describes a regular line, for example along at least one substantially circular portion, so that the plate being arranged vertically, the change in the orientation of the card, for example about an axis which is perpendicular to the plate and passes substantially through the center of said circular portion, causes the liquid to flow from one section of the continuous flow circuit to another.

This portion of the planar flow segment may also be of sinusoidal shape.

The analysis card defined above has a number of other advantages.

Having the liquid flow simply under gravity, that is to say without using or involving large forces, makes it possible to avoid virtually any formation of bubbles, due to gasses being dissolved or re-released, within the liquids which are flowing. Further, if a liquid sample which itself initially contains bubbles or microbubbles flows within the card, then they can be almost fully eliminated or degassed. This constitutes a fundamental advantage, in particular in view of the size, for example on the capillary scale, of the streams of liquid that may flow in cards of this type, given that the presence of bubbles, small as they may be, interferes with or disrupts not only the flow regime of the liquids but also the accuracy with which they move and are observed, for example by optical means, and consequently has an effect on the quality of the analysis.

Further, the analysis device or card according to the invention can be handled or treated with ease, which means that the corresponding equipment is designed with particular simple mechanisms or automation systems, in particular a robotic system.

BRIEF DESCRIPTION OF THE DRAWINGS

The present invention will be described below with reference to the appended drawing, in which:

FIG. 11 represents a view in partial vertical section of the analysis card according to FIG. 10

FIGS. 12 to 15 represent three different embodiments of the means for permanently closing off a vent orifice and/or an introduction orifice, having the reference 9 throughout the figures FIG. 16 schematically represents an analysis card, seen from the front, according to a third embodiment of the invention FIG. 17 represents, again seen from the front, an analysis card according to the invention according to a fourth embodiment

Figure 1:
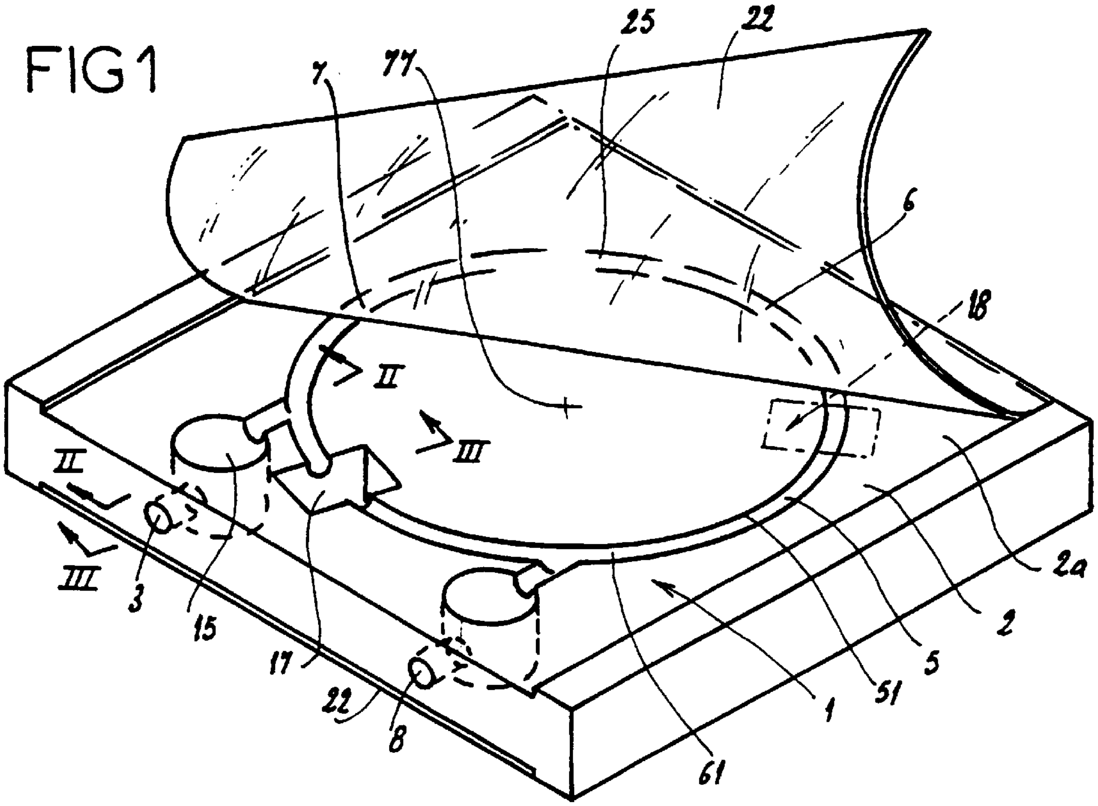
FIG. 1 represents, in perspective and with partial cutaway, an analysis card according to a first embodiment of the invention
Figure 2:
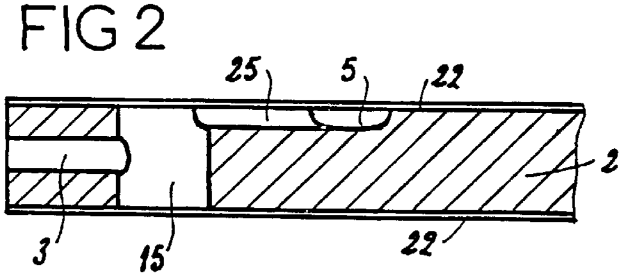
FIGS. 2 and 3 represent partial vertical sections, respectively on the lines II—II and III—III in FIG. 1
Figure 3:
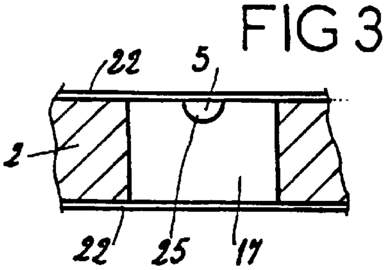

It should be pointed out to begin with that the representations in the drawings are not true to scale, and in particular the size of the flow duct or ducts has been intentionally exaggerated for the purpose of explaining the present invention.

DETAILED DESCRIPTION

In terms of fluidics, the analysis card 1 represented in FIG. 1 comprises a continuous liquid flow circuit 5, integrated or arranged at least partly in the body 2, which is in the form of a plate, of the analysis card 1.

As shown by FIG. 1, and again as regards fluidics, the continuous flow circuit 5 combines the following in a loop:

- an operating compartment 6 which, may or may not, in particular, have a reagent in it;
- a transfer duct 7 communicating via a branch path with an orifice 3 for introducing an initial liquid sample;
- a duct 61 for return to the transfer duct 7, communicating via a branch with a vent orifice 8;
- an observation chamber 17.

The term "operating compartment" is intended to mean any compartment, irrespective of its physical form, which makes it possible to carry out any operation or treatment of the liquid sample which is treated, inside the time for which said sample remains in said compartment. The nature of the operation in question may be physical, mechanical, chemical, biochemical or biological. To this end, the compartment in question may, beforehand (for example in dry and/or liquid form), or at the time of the operation or treatment, contain any reagents or physical means which assist said operation.

The term “observation chamber” is intended to denote any means which is formed or arranged in the body and makes it possible to obtain qualitative and/or quantitative information on the basis of one or more parameters or characteristics observed directly or indirectly in any liquid present in said chamber 17. By way of example and for the purpose of biological analysis, the observation chamber, which communicates with and is contained in the circuit 5, is designed, in particular with transparent walls, to detect or measure a parameter, in particular an optical one, for example fluorescence, to obtain a signal representative of the presence and/or quantity of a biological analyte, for example an antibody, a nucleic acid and the like.

The above description shows that, apart from the branchings or offshoots to the introduction orifice 3 and the vent orifice 8, the circuit 5 is looped onto itself, insofar as a liquid sample flowing in it from a given point can be recycled to this point.

Figure 4:
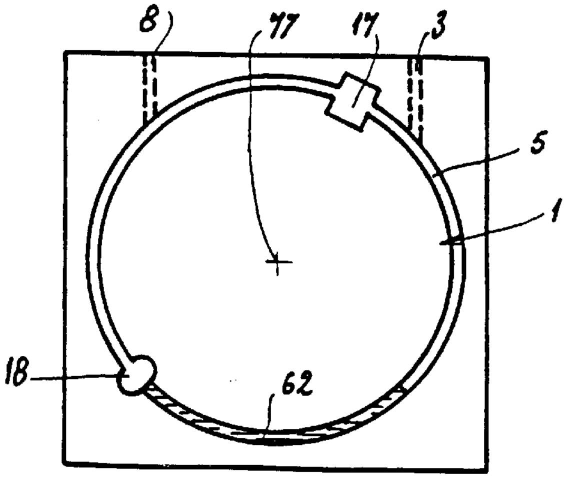
FIGS. 4, 5 and 6 represent schematic views of the analysis card represented in FIG. 1, for three different respective phases in the handling of the analysis card FIGS. 7 to 9 schematically represent three different respective versions of the means for retaining the liquid which is schematically represented in FIG. 1 by the reference 18

According to the invention, the continuous flow circuit 5 describes a determined geometrical line in two dimensions of the card 1, in this case a circular line, such that any change in the orientation of the card, when arranged vertically, as shown in FIG. 4, with respect to a three-dimensional reference frame which includes a vertical reference dimension, causes the liquid present in the circuit to flow, solely under the effect of gravity, from one section to another, for example from one or the other side of the operating compartment 6, this taking place in controlled fashion according to the amplitude of the change in orientation with respect to the aforementioned reference frame.

In practice, as shown in FIG. 1, with the body 2 having the shape of a plate, the geometrical line described by the circuit 5 comprises a planar segment 51, which coincides with the face 2*a* of the plate, and this planar segment 51 comprises or consists of a substantially circular portion, thus forming a regular line. In this way, when the analysis card 1 is arranged vertically, any change in the orientation of the card in the vertical plane about an axis 77 which is perpendicular to the plate 2 and passes preferably substantially through the center of the circular portion defined by the planar segment 51, causes the liquid to flow from one section of the circuit 5 to another, for example from one or the other side of the operating compartment 6.

It should be understood that the geometrical line described by the planar segment 51 may be regular or broken, and that this segment may comprise both a substantially circular portion and a substantially sinusoidal portion. However, this geometrical line remains continuous in the sense of the definition given above.

As shown by FIG. 1, the vent orifice 8 communicates with the circuit 5 at a junction point other than the point where the introduction orifice 3 joins the circuit 5.

It has not been represented, but will be described below with reference to FIGS. 11 to 15, that the vent orifice 8 and the introduction orifice 3 include or are associated with means for permanent closure, for example sealing.

A settling chamber 15 is arranged or formed in the body 2, downstream of the introduction orifice 3, in the direction in which the liquid sample is introduced, and the circuit 5 may be looped either onto the settling chamber 15 or downstream thereof.

Figure 7:
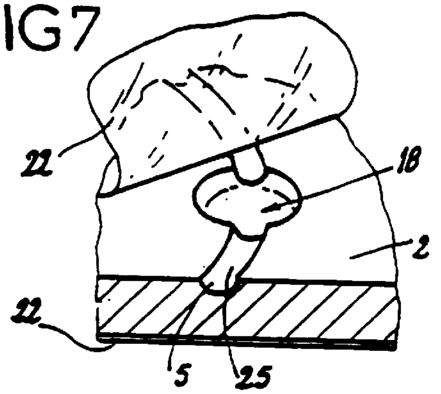
Figure 8:
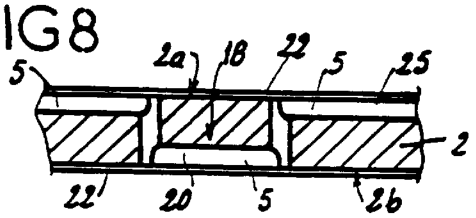
Figure 9:
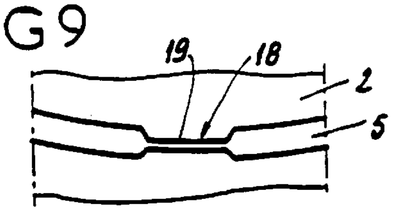

The operating compartment 6 is delimited in the continuous flow circuit 5, in the direction in which the liquid sample is introduced, by at least one means 18 for retaining the liquid which is introduced, this means being chosen or designed to give said liquid free passage under the effect of a minimum hydrostatic head. To do this, various means which are represented in FIGS. 7 to 9 can be used:

- the retention means 18 is a local arrangement of the continuous flow circuit 5, generating a head loss, for example by a constriction 19 shown in FIG. 9, or a chicane 20 shown in FIG. 8. This chicane 20 is obtained, passing from the upper face 2*a* to the lower face 2*b* of the body 2 via a first vertical through-duct, flowing over the lower face 2*b*, then rising to the upper face 2*a* via a second through-duct;
- (not shown) the retention means 18 may consist of a local point-like hydrophobic coating of the circuit 5, which consequently has a low degree of wetting and, in the absence of a minimum head, hinders the flow of the liquid;
- more particularly, and as represented in FIG. 7, the retention means 18 consists of two notches which are arranged facing one another, on either side of the duct 5, and form with it a local liquid holding zone.

In terms of manufacture, the analysis card 2 is obtained essentially by precision molding of a technical plastic which is compatible with the liquids that are treated. In this way, directly obtained by molding, the circuit 5 is formed at least partly by a channel 25 formed at least partly at the surface of one 2*a* and/or the other face 2*b*, it being understood that, as shown by FIGS. 1 and 8 in combination, the circuit 5 extends over one 2*a* and/or the other face 2*b* of the body, which are parallel to one another, while optionally passing entirely through the body 2, locally, at one or more points of the continuous flow circuit 5.

In order to ensure that the circuit 5 is leaktight with respect to other circuits or ducts present on the body 2, and also with respect to the exterior, the two faces 2*a* and 2*b* of the body 2 are coated in leaktight fashion by two sheets or films, for example made of transparent plastic, 22.

In view of the analysis process to be carried out within the card 1, the operating compartment comprises, free or fixed with respect to the body, one or more reagents. The fixing may involve either covalent chemical bonding of the reagent to the wall of the circuit 5 or weak bonding, for example by adsorption or absorption of the reagent onto this wall.

The way in which the analysis card 1 operates can be explained with reference to FIGS. 4 to 5, the analysis card 1 being arranged vertically.

With reference to FIG. 4, the introduction orifice 3 and the vent orifice 8 are open. The liquid sample to be analyzed, optionally associated with a reagent, is introduced via the orifice 3, by means of which a liquid column 62 is formed at the bottom of the circuit 5 in equilibrium, and in contact with the reagent contained in the operating compartment 6. The orifices 8 and 3 are then hermetically sealed, so that the card is isolated from the exterior.

By angular rotation of the card 5 through plus or minus 45° (depending on the trigonometric sense), the liquid sample is caused to flow in one direction then in the other, in contact with the reagent, so that a reaction develops between the liquid sample and the reagent.

Figure 5:
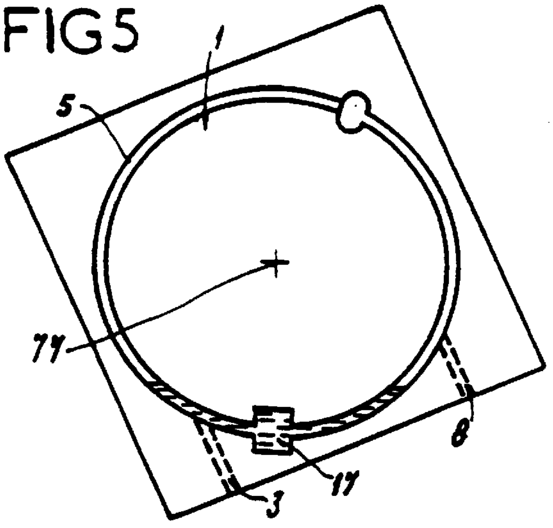

In the angular position represented in FIG. 5, the liquid column has moved into the observation chamber 17. Further, by rotation on either side of the angular position represented in FIG. 5, the liquid can be made to flow through the chamber 17, in one direction then in the other. It is thus possible to detect and/or measure the analyte present in the chamber 17.

Figure 6:
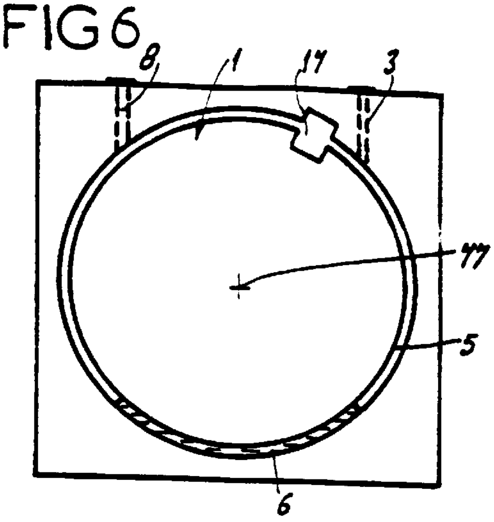

Once the measurement has been taken, the initial position, represented in FIG. 6, is resumed and the used analysis card can be disposed of.

Figure 10:
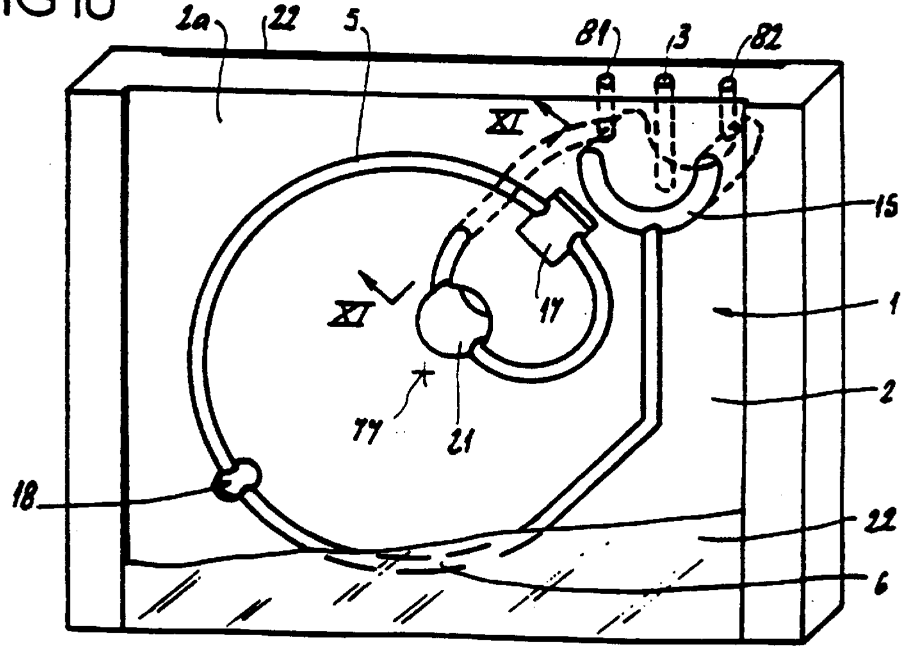
FIG. 10 represents a front view of an analysis card according to a second embodiment of the invention

The analysis card according to the second embodiment (cf. FIG. 10) differs from the first embodiment by the following points:

a compartment 21 is arranged and formed flat, substantially at the center of the body 2, and once it has been sealed it forms a chamber contained in the continuous liquid flow circuit 5. This compartment is sealed and closed off by a diaphragm from which, through successive depression and release, makes it possible to draw the liquid sample in through the introduction orifice 3;

the orifice 3 for introducing the liquid sample opens into a settling chamber 15, before communicating with the circuit 5 proper. The settling chamber 15 is provided with at least one vent 81 and/or 82 which is closed when the cavity 21 is used to draw the liquid in and pass it through the duct 5;

at the outlet of the compartment 21, the circuit 5 is looped onto the settling chamber 15, via a through-duct passing from the face 2*a* to the face 2*b* of the body 2.

The compartment 21 has a further function: it makes it possible in practice to absorb the pressure variations within the analysis card.

As shown by FIGS. 2 to 14, the means for permanently closing off the orifice 3 or 16 (cf. FIG. 17) and the vents 81, 82 may be chosen from the following means:

according to FIG. 12, this means is a permanent closure cap 10;

according to FIGS. 13 and 14, this closure means associates the duct 11 for introducing the liquid sample, the active end 11*a* of which can assume two positions with respect to the body 2, namely a retracted position (FIG. 13) communicating in leaktight fashion with a cavity 12 for introducing the liquid, and a forward position (FIG. 14), penetrating in leaktight fashion in a calibrated blind orifice 13 formed in the body 2; in the latter position, the introduction duct 11 is sealed;

and an adhesive tape 14 which is attached in leaktight and adhesive fashion on the orifice 3, cf. FIG. 15.

The analysis card according to the third embodiment (cf. FIG. 16) differs from the first embodiment in that the planar segment 51 of the circuit 5 describes a line consisting of at least two substantially circular portions 511 and 512 which are concentric and connected together in series via a duct passing entirely through the body 2.

Of course, although not described specifically with reference to the figures, it is perfectly comprehensible to the person skilled in the art that the following variations may be made:

a plurality of operating compartments 6 may be formed and arranged in the body 2, while being contained in series in the continuous flow circuit 5 in such a way that a controlled change in the orientation of the card 2 allows the liquid sample to be made to flow suitably into one and/or other operating compartment;

a plurality of continuous liquid flow circuits 5 may be arranged or formed in the body 2, and connected together in series and/or in parallel.

In this regard, the various circuits 5 may communicate with the same introduction orifice 3 or 16, or respectively with two separate orifices 3 and 16, for two liquid samples respectively. In this regard, the circuits 5 can communicate with the same observation chamber 17, or respectively each with one separate observation chamber 17 for each treated sample.

The analysis card according to the fourth embodiment of the invention (cf. FIGS. 17 to 20) differs from the first embodiment by the following characteristics.

Figure 18:
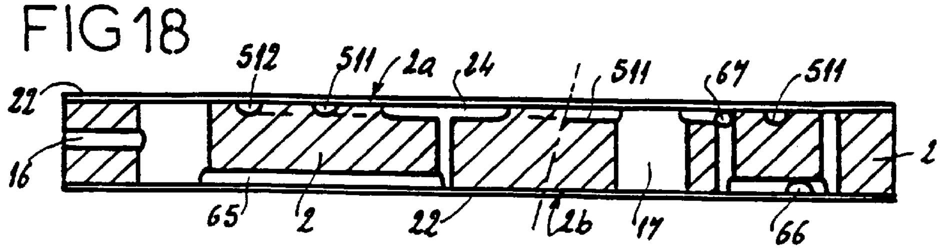
FIG. 18 represents a view in vertical section, on the line XVIII—XVIII in FIG. 17, of the analysis card shown in FIG. 17

As in the case of FIG. 16, the circuit 5 includes a planar segment 51 consisting of two substantially circular portions 511 and 512 which are concentric and connected together in series, while passing below the portion 511, as shown on the right-hand side of FIG. 18.

There are two separate orifices for introducing liquid or reagent, namely 3 and 16.

An auxiliary circuit 23 is arranged or formed in the body 2 on the face 2*a* of the corresponding plate, and comprises:

a cavity 24, formed on the face 2*a* and connected via a discharge duct 67 to the continuous flow circuit 5, and via a duct 67 to the vent 8;

a transfer duct 65, arranged or formed on the lower face 2*b* and joining, on one side, the introduction orifice 16 and, on the other side, the cavity 24 at its center.

The above description shows that the auxiliary circuit 23 communicates, on one side, with the circuit 5 and, on the other side, has no exit or outlet other than the vent 8.

Further, the result of the geometry of the auxiliary circuit 23, and in particular of the arrangement of the cavity 24, these being shown in FIG. 17, is that:

any change in the orientation of the card in a negative rotational sense (with respect to the trigonometric sense) through a limited amplitude, prevents the introduction of any liquid contained in the auxiliary cavity 24 into the circuit 5;

and conversely, any change in the orientation in the other rotational sense and that is to say in the positive sense, makes it possible to introduce any liquid contained in the cavity 24 into the main circuit 5.

The above characteristic is obviously useful for temporarily storing a reagent and introducing it in controlled fashion into the circuit 5, at any moment during the analysis process.

Figure 19:
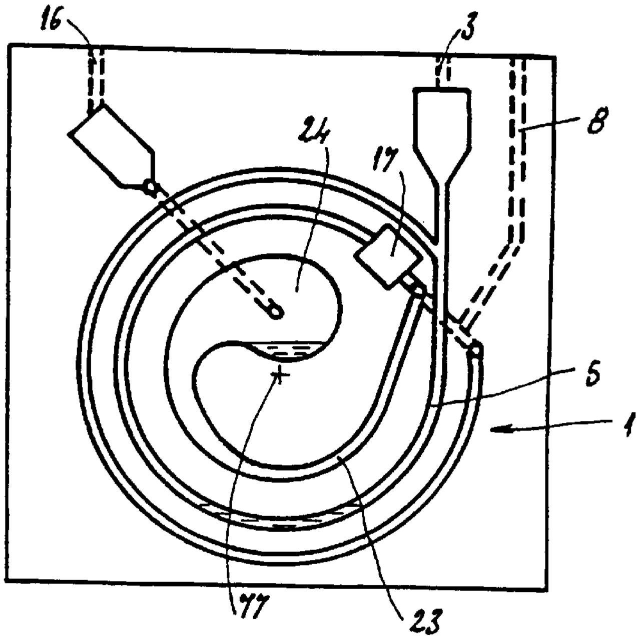
FIGS. 19 and 20 schematically represent the analysis card represented in FIG. 17, in two different respective positions corresponding to two different phases in the handling of the analysis card
Figure 20:
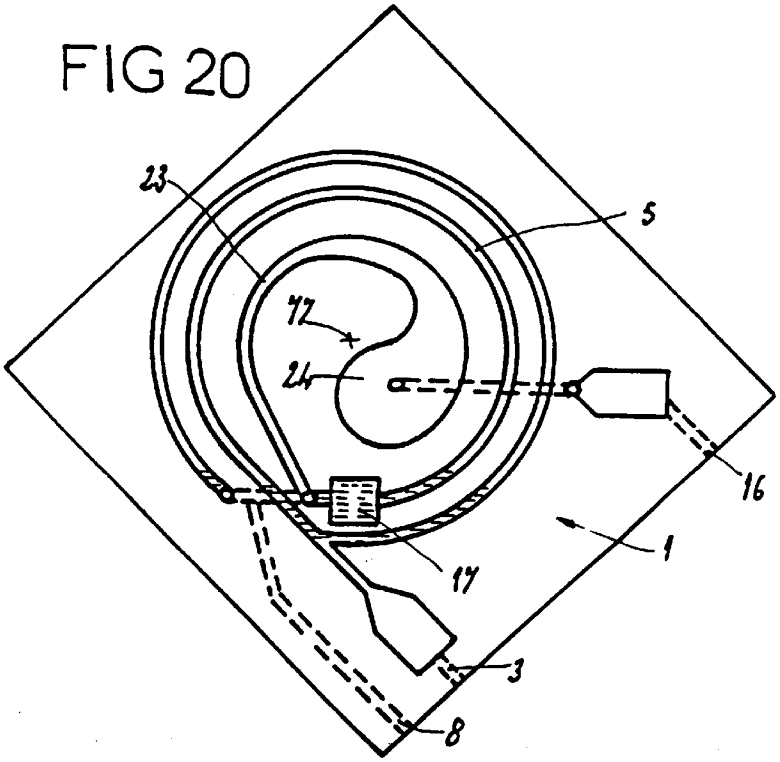

This is, in particular, shown by the changing orientation between FIGS. 19 and 20, making it possible to introduce the reagent into the main loop.

Moreover, with reference to FIGS. 17 to 20, the liquid (reagent for example) is injected at the introduction orifice 16 and, using the duct 65, fills the cavity 24 via an outlet orifice emerging at the tip of a nipple lying substantially at the center and two thirds of the way up the cavity 24. Once the cavity 24 has been filled, when the card is rotated in the negative rotational sense, the liquid remains confined in this cavity, then in the event of a new rotation, still in the negative sense, the liquid remains in this cavity so long as the amount of liquid is preset so that it does not reemerge via the outlet orifice lying two thirds of the way up the cavity 24.

EXAMPLE

An example of the utilization of an analysis device according to FIG. 16 will now be described.

The use of this device for the automated and confined sequencing of biological steps has been validated in the context of performing a test to detect the tuberculosis agent: the bacterium Mycobacterium tuberculoses [sic].

To do this, components of the "MTD-2" diagnostic kit available from the company Gen-Probe (San Diego, Calif.) were used. The principle of this test is based on the selective in vitro amplification of target nucleic acids (ribosomal RNA 16S) by the "Transcription-Mediated Amplification" (TMA) technique, followed by the luminescent detection of the amplification products using the homogeneous "Hybridization Protection Assay" (HPA) technique.

The "MTD-2" amplification test was carried out using the supplier's manual protocol with some modifications. In brief, the reaction was assembled by combining 25 μl of a positive control (10 exp 6 copies of an rRNA 16S molecule synthesized in vitro, corresponding to about 100 bacterial cells) or 25 μl of a negative control (ultrapure water, of resistivity greater than or equal to 18 Megaohms), with 12.5 μl of reconstituted amplification reagent, in a 12×75 mm 5 ml tube (polypropylene), the assembly being covered with 200 μl of mineral oil. The tube is heated for 5 minutes at 95° C., cooled to 42° C. for 5 minutes (thermostated dry baths), then 12.5 μl of enzymatic reagent are added and mixed by gentle stirring. The reaction is incubated for one hour at 42° C. (water bath) then put on ice until being subjected to the detection step using HPA.

The HPA detection was carried out in a separate tube on 10 μl of the reaction mixture (⅕ of the reaction) supplemented by 90 μl of water, to which 100 μl of acridinium ester probe are added. The tube is incubated for 15 minutes at 60° C. (water bath) to hybridize the probe, and a selection step is carried out with 300 μl of selection reagent. Each tube is then incubated for 15 minutes at 60° C. The reactions are then cooled to room temperature (5 minutes), then directly read on the GenProbe luminometer for 3 seconds.

The luminescence results obtained (in Relative Luminescence Units, RLU) are 4, 319, 456 RLU for the positive control and 1282 RLU for the negative control, the positivity threshold indicated by the manufacturer being 30,000 RLU.

Figure 21:
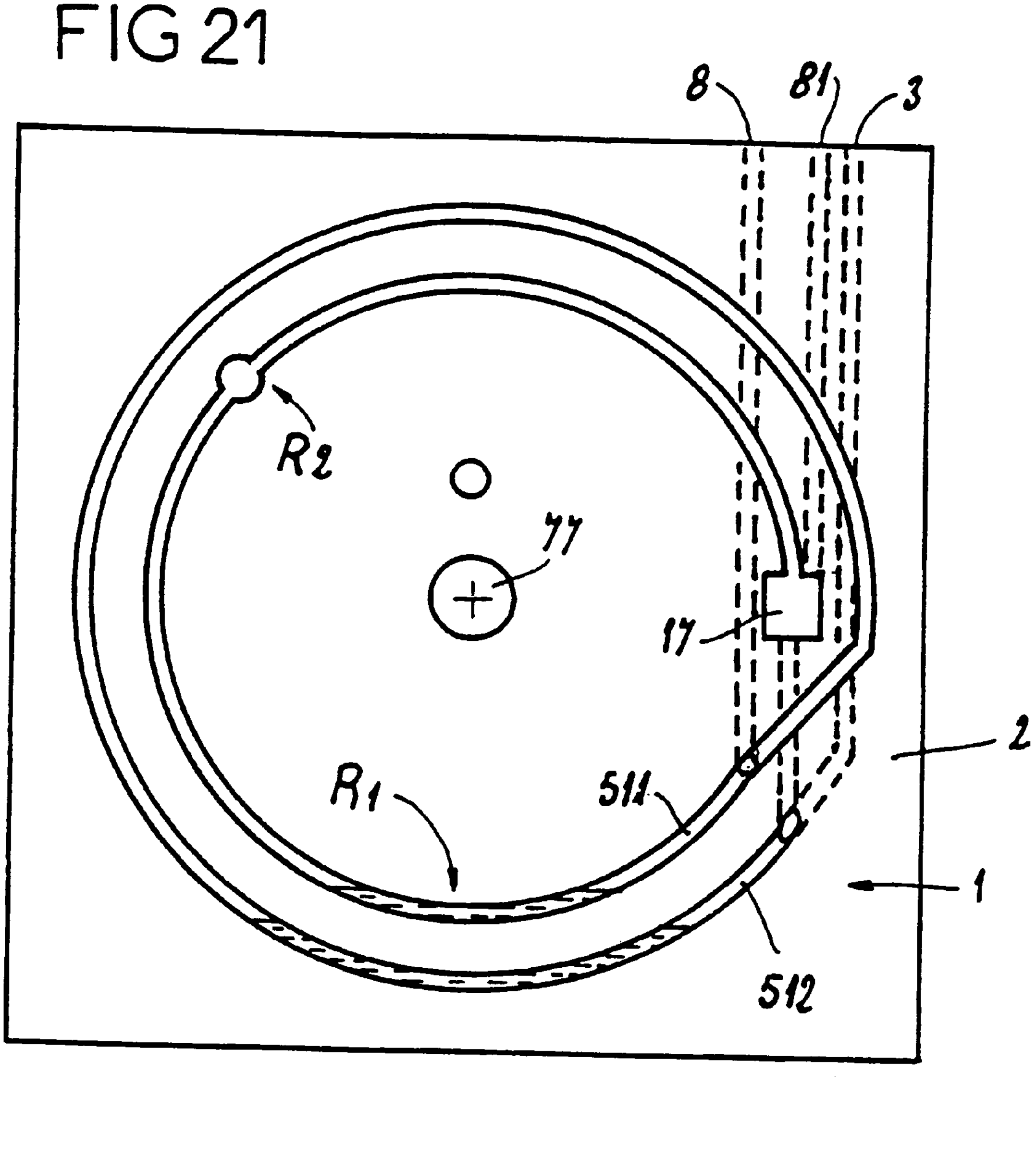
FIG. 21 represents an embodiment of a device according to the invention as used for the test described in Example 1.

The amplification steps were automated with a card or device 1 according to FIG. 21, obtained in a body 2 machined into a square plate having a side length of 10 cm and a thickness of 3 mm. The card is made functional by applying a transparent adhesive film 22 of the BOPP type to the body, in order to close the flow circuit 5 in leaktight fashion. Beforehand, a solid bead of enzymatic reagent is arranged and contained in a minicuvette provided for this purpose in the "R2" position of the flow circuit. This bead, with a diameter of 2 mm, is obtained by freeze-drying droplets of a trehalose solution (20%) containing the equivalent of one unitary dose of enzyme needed to perform a TMA amplification reaction. This type of reagent form has the advantage of being stable for months at room temperature and of dissolving immediately in contact with an aqueous solution. The card formed in this way is considered as the analysis device within which the amplification steps are carried out automatically starting with a sample.

The test within the device starts with a single initial phase of introducing reagents using the manipulator or an instrument for dispensing liquids. 150 μl of wash buffer (PBS 1X, Tween-20 0.5%) are introduced into the outer circular segment of the card, via the orifice 81 communicating with the circuit 5, below the position "R1" along the inner circular segment. The sample to be tested is composed of 25 μl of positive or negative control, as described above, to which 12.5 μl of enzyme dilution buffer (Gen-Probe) and 12.5 μl of reconstituted amplification reagent are added. The combination is injected through the orifice 8 into position "R1" of the card.

The device is inserted vertically into a computer-driven machine, a program of which permits simultaneous control of the steps of rotating the card about its central axis (speed, amplitude, acceleration, polarity, sequencing) and the temperature of the liquids contained in the outer and inner circular segments of the card, by means of a heating pad. This heating pad is in direct contact with the adhesive film of the device, the small thickness of the latter ensuring perfect heat exchange for controlling the temperature inside the liquid segment level with it. The pad covers the circular segments over an angular amplitude of 45° on either side of the lower position of the device (in line with the "R1" position), the position at which the liquids are permanently found irrespective of the rotation of the device, owing to the combined effect of gravity and the liquid piston inherent in the present invention. The heating pad is controlled by a thermocouple probe; it is heated actively, although it is cooled passively, under the effect of an air flow at room temperature (20–25° C.) delivered by a pump under a pressure of 0.5 bar.

The treatment program of the device or card is carried out as follows: once the card has been filled with the wash buffer and the sample, as described above, it is inserted into the machine, the target temperature of which is 65° C. (preheating carried out). The initial position of the card is the one or the sample and the wash buffer are centered on the position R1. The sample is homogenized by 30 continuous oscillations of amplitude ±30°, centered on the position "R1" (i.e. a maximum total amplitude of 60° per oscillation) and simultaneously incubated for 5 minutes at 65° C. The temperature is then stabilized at 42° C. for 2 minutes, the card then being stationary in the initial position. With the temperature of the pad remaining at 42° C., a rotation through 140° C. (counter-clockwise) is carried out, which allows the liquid fraction to be centered on the position "R2". 6 continuous oscillations of amplitude ±45° centered on the position "R2" (i.e. a maximum total amplitude of 90°) ensure that the ball of enzymatic reagent dissolves perfectly, then a rotation through 140° (clockwise) is carried out in order to reposition the reaction medium level with "R1". The card is incubated at 42° C. in a fixed position for one hour.

In order to determine the effectiveness of the automated TMA amplification process in the single-use device of the present invention, the reaction medium is sampled and put on ice before being assayed using the reference HPA method. For reasons of instrumentation inherent in the reference method, the detection process is not carried out here inside the card, but the incorporation during the TMA amplification process of markers (for example fluorescent markers) makes it possible, through the presence of wash buffers in the card, to detect the amplification products by specific capture on probes immobilized in the observations chamber. The HPA detection was carried out here in a separate tube on 10 μl of reaction mixture (⅕ of the reaction) supplemented by 90 μl of water, to which 100 μl of acridinium ester probe are added. The tube is incubated for 15 minutes at 60° C. (water bath) to hybridize the probe, and a selection step is carried out using 300 μl of selection reagent. Each tube is then incubated for 15 minutes at 60° C. The reactions are then cooled to room temperature (5 minutes) then directly read on the Gen-Probe luminometer for 3 seconds, as in the context of the manual tests, using the protocol recommended for the use of the "MTD-2" diagnostic kit (Gen-Probe).

The luminescence results obtained (in Relative Luminescence Units, RLU) are, in the case of the process described above, 3, 822, 510 RLU for the positive control and 2357 RLU for the negative control, the positivity threshold indicated by the manufacturer being 30,000 RLU. These results therefore show that the detection of the positive control takes place properly, while the negative control does not generate a significant signal.

Comparative analysis of the results of the "MTD-2" test, the TMA amplification part of which was carried out manually, or automatically according to the invention, therefore demonstrates that it is possible to change over from a manual test to a device according to the invention and that the single-use card according to the invention makes it possible to carry out all the biological steps of a test which, as in manual mode and equally sensitively, detects the equivalent of 100 bacteria.

The benefit of such a device according to the invention is great, in particular in the field of molecular biology, the techniques of which, such as TMA, make it possible to detect pathogens sensitively and quickly. Nevertheless, in view of their performance, these techniques are very sensitive to contamination from the environment or introduced during handling for carrying out intermediate steps of adding or mixing reagents, therefore leading to erroneously positive tests. The present invention makes it possible to carry out the amplification steps under confinement and isolation, and to sequence them if appropriate with the detection steps, starting from the introduction of a sample into the single-use device. The latter can therefore contain ready-to-use reagents in stabilized form, which can be packaged and prepared in a contamination-free controlled environment. An experimenter therefore needs merely to ensure the absence of contamination during the steps of preparing the sample, before the test is carried out, and when this is being introduced into the card. More generally, when the detection steps are also incorporated into the card, disposal of and destruction of the card from the laboratory without ever opening it makes it possible to carry out all the steps upstream of such an amplification and detection test; pretreatment of clinical samples, lysis of microorganisms, extraction of nucleic acids can be carried out in the same working environment, without the risk of producing erroneous results.

We claim:

1. Analysis device (1) comprising a body (2) in which the following are arranged or formed:

an orifice (3) for introducing an initial liquid sample, a liquid flow circuit (5), comprising at least one operating compartment (6) for a treated liquid sample, obtained with all or some of the initial sample, communicating with said introduction orifice (3), said flow circuit describing, in at least two dimensions of the card, a determined geometrical line such that any change in the orientation of the card in a three-dimensional frame, including a vertical reference dimension, causes the liquid to flow solely under gravity from one section of said circuit to another, for example from one side or the other with the operating compartment (6), wherein said liquid flow circuit further comprises an observation chamber, and wherein said obseravation chamber is a means for providing qualitative and/or quantitative information on the liquid in said analysis device, said observation chamber further being either one of the same as said operating compartment and spaced from said operating compartment, characterized in that the flow circuit (5) is continuous and looped on itself between said introduction orifice (3) and said operating compartment (6).

2. Device according to claim 1, comprising at least one liquid transfer duct (7), arranged or formed in said body (2), communicating on one side with the introduction orifice (3) and, on the other side, with the operating compartment (6), characterized in that the flow circuit (5) is looped onto the transfer duct (7).

3. Device according to claim 1, characterized in that the geometrical line described by the continuous flow circuit (5) comprises at least one planar segment (51) lying in a plane, and said segment itself describes a regular or broken line such that, with the plate (2) arranged vertically, the change in the orientation of the card in the vertical plane causes the liquid to flow from one section of the continuous flow circuit (5) to another.

4. Device according to claim 3, characterized in that the planar segment (51) comprises at least one substantially sinusoidal portion.

5. Device according to claim 3, characterized in that the planar segment (51) comprises at least one substantially circular portion, so that the change in the orientation of the card, about an axis (77) which is perpendicular to the plate (2) and passes substantially through the center of said circular portion, causes the liquid to flow from one section of the continuous flow circuit (5) to another.

6. Device according to claim 5, characterized in that the planar segment (51) describes a line consisting of at least two substantially circular, optionally concentric, portions (511, 512) connected together in series.

7. Device according to claim 1, comprising a vent orifice (8), characterized in that the latter communicates with the continuous flow circuit (5) at a junction point other than the point where the introduction orifice (3) joins with said circuit.

8. Device according to claim 7, characterized in that the introduction orifice (3) and/or the vent orifice (8) include or are associated with means for permanent closure (9), for example sealing.

9. Analysis device according to claim 1, characterized in that a settling chamber (15) is formed or arranged in the body (2), downstream of an introduction orifice (16), in the direction in which the liquid sample is introduced, and the continuous flow circuit (5) is optionally looped onto said chamber.

10. Device according to claim 1, characterized in that the continuous flow circuit (5) for the liquid comprises said observation chamber.

11. Device according to claim 10, characterized in that said continuous flow circuits (5) communicate with the same observation chamber (17), or respectively with two separate observation chambers (17).

12. Device according to claim 10, characterized in that the observation chamber (17) is designed to permit optical reading.

13. Device according to claim 1, characterized in that a plurality of continuous liquid flow circuits (5) are arranged or formed in the body (2), and are connected together in series and/or in parallel.

14. Device according to claim 13, characterized in that said continuous flow circuits (5) communicate with the same introduction orifice (3, 16), or respectively with two separate introduction orifices (3, 16), for two liquid samples respectively.

15. Device according to claim 1, characterized in that the operating compartment (6) is delimited in the continuous flow circuit (5) by at least one means (18) for retaining the liquid, designed to allow said liquid free passage under the effect of a minimum head.

16. Device according to claim 15, characterized in that the retention means (18) is a local arrangement of the continuous flow circuit (5), generating a head loss, for example a constriction (19) or a chicane (20).

17. Device according to claim 15, characterized in that the retention means (18) consists of a local hydrophobic coating of the continuous flow circuit (5).

18. Device according to claim 15, characterized in that the retention means (18) consists of two notches which are arranged facing one another, on either side of the continuous flow duct (5), and form with it a local holding zone for the liquid.

19. Device according to claim 1, characterized in that one compartment (21) is arranged or formed in the body (2) and is contained in the continuous flow circuit (5).

20. Device according to claim 1, characterized in that another orifice (16) for introducing a liquid sample is formed in the body (2), and includes or is associated with permanent closure means (9).

21. Device according to claim 1, characterized in that a plurality of operating compartments (6) are formed and arranged in the body (2), and are contained in series in the continuous flow circuit (5).

22. Device according to claim 1, the body (2) comprising two opposite plane faces (2*a*, 2*b*), for example parallel to one another, characterized in that the continuous flow circuit extends over one (2*a*) and/or the other face (2*b*) of the body, optionally passing entirely through said body.

23. Device according to claim 1, characterized in that one and/or the other face (2*a*, 2*b*) of the body are each covered in leaktight fashion with a sheet (22), and the continuous flow circuit (5) is formed at least in part by a channel (25) formed partly at the surface, on one and/or the other face (2*a*, 2*b*) of the body, and by said sheet or sheets closing said channel in leaktight fashion with respect to the exterior of the plate.

24. Device according to claim 1, characterized in that the operating compartment (6) comprises, free or fixed with respect to the body (2), a reagent.

25. Device according to claim 1, characterized in that, firstly, at least one auxiliary circuit (23) is arranged or formed in the body, and communicates on one side with the continuous flow circuit (5) for the liquid, and has no outlet on the other side, secondly a cavity (24) formed and arranged in the body (2) is contained in the auxiliary circuit (23), and thirdly the geometry of the auxiliary circuit (23) and the auxiliary cavity (24) is determined such that any change in the orientation of the card in a reference direction prevents a liquid contained by the auxiliary cavity from being introduced into the continuous flow circuit (5), and any change of orientation in the other direction permits said introduction.

* * * * *